F. S. WASHBURN.
PROCESS OF MAKING MONO-AMMONIUM PHOSPHATE.
APPLICATION FILED AUG. 3, 1914.
1,142,068.
Patented June 8, 1915.
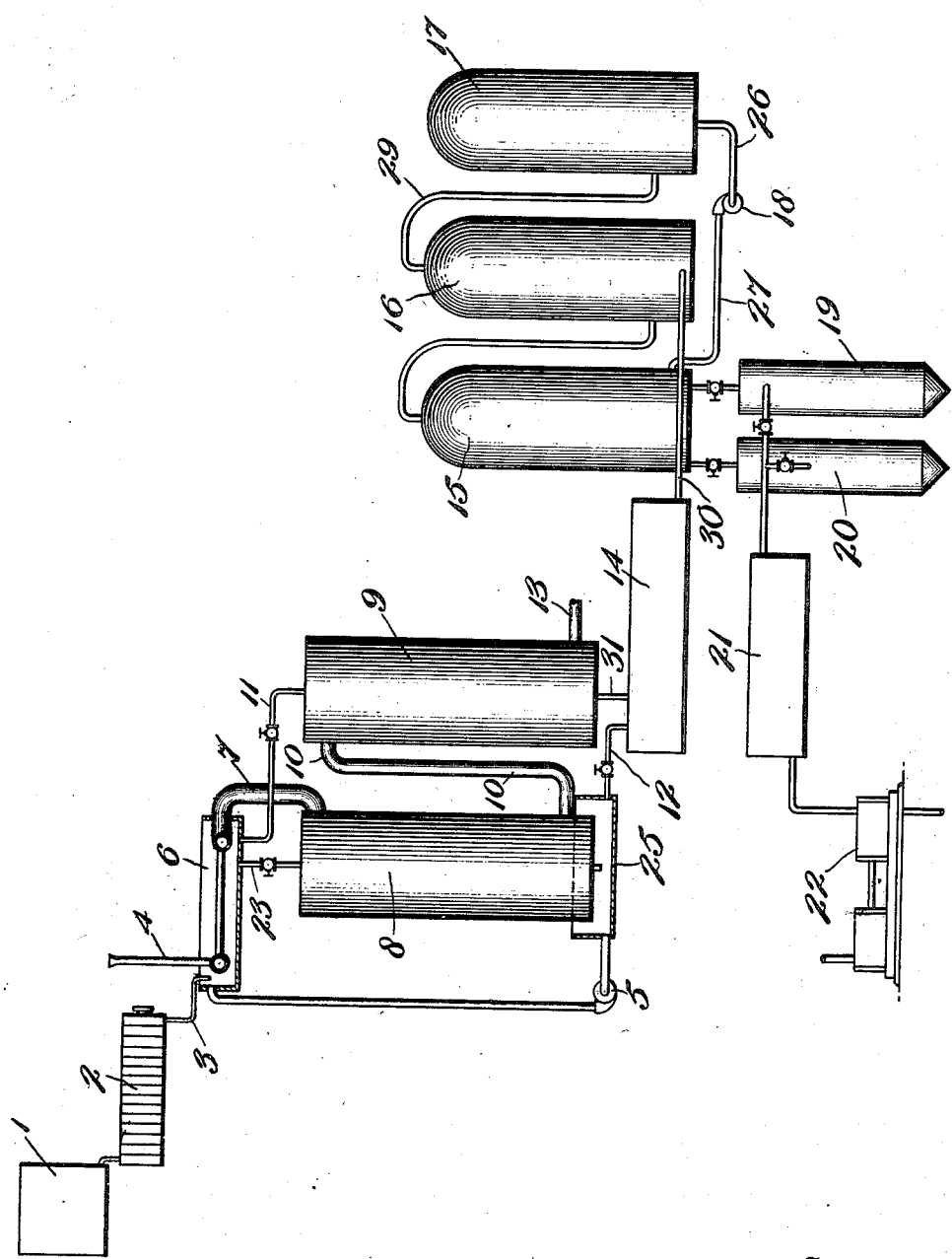

UNITED STATES PATENT OFFICE.

FRANK S. WASHBURN, OF NASHVILLE, TENNESSEE.

PROCESS OF MAKING MONO-AMMONIUM PHOSPHATE.

1,142,068.      Specification of Letters Patent.      Patented June 8, 1915.

Application filed August 3, 1914. Serial No. 854,858.

*To all whom it may concern:*

Be it known that I, FRANK S. WASHBURN, a citizen of the United States, residing at Nashville, in the county of Davidson and State of Tennessee, have invented certain new and useful Improvements in Processes of Making Mono-Ammonium Phosphate; and I do hereby declare the following to be a full, clear, and exact description of the invention, such as will enable others skilled in the art to which it appertains to make and use the same.

This invention relates to a process of making ammonium phosphate especially adapted for fertilizer purposes from phosphate rock, and has for its object to provide a process which will be more efficient and less costly than those heretofore proposed.

With these and other objects in view the invention consists in the novel steps and combinations of steps constituting my invention, all as will be more fully hereinafter disclosed and particularly pointed out in the claims.

Referring to the accompanying drawing forming a part of this specification in which the figure is a diagrammatic illustration of one form of apparatus suitable for carrying out my process, 1 indicates suitable dissolving tanks for treating finely divided phosphate rock with sulfuric acid; 2 a filter press for separating the phosphoric acid solution from the insoluble residue; 3 a discharge pipe from the filter press 2 into the acid heating tank or system 6; and 4 represents any suitable escape pipe for steam from said system.

5 indicates an acid circulating pump connected to the acid heating system 6 as shown; and 11 a pipe for conducting hot acid to the first ammoniating tower 9, while 10 represents a pipe conducting unabsorbed ammonia vapor and gases to a second ammoniating tower 8 connected to the acid heating system 6 by the steam conducting pipe 7.

13 represents an inlet for a mixture of steam and ammonia fed to the first tower 9; and 12 a pipe connecting the fresh acid tank 25 with the adjusting tank 14 adapted to receive super ammoniated acid from tower 9.

15, 16 and 17 represent a triple effect evaporator the elements being connected as shown, and 18 a pump connected to the effect 17 by the pipe 26 and to the effect 15 by the pipe 27 as illustrated.

19 and 20 represent alternate receivers for the fused liquid under a high vacuum, while 21 represents a surface condenser and 22 a vacuum pump connected as shown.

In order that my process may be clearly understood it is said: I start with finely ground phosphate rock in tanks 1, and add sufficient sulfuric acid to the same to convert all of the tri-calcium phosphate into calcium sulfate and free phosphoric acid, and dissolve the impurities in the rock, by adding an additional amount of sulfuric acid. If it is desired to produce this phosphoric acid in a dilute form, the quantity of sulfuric acid to be added need only be sufficient to dissolve the impurities present and convert the tri-calcium phosphate into phosphoric acid, but if it is desired to obtain a phosphoric acid in a concentrated solution, containing say as much as 25%, $P_2O_5$, then one must add a slight excess of sulfuric acid in order to take care of the well known chemical phenomena of mass action, which is found to play an increasingly important part in the reaction as the concentration of phosphoric acid in the solutions increases. For instance, if one wishes to obtain a 20% $P_2O_5$ solution, it is necessary to have in this solution a few tenths of a per cent. of free sulfuric acid in order to obtain a high efficiency of extraction, while if one wishes to work to as high as 25% $P_2O_5$ in the extracted phosphoric acid, then this solution should contain nearly 1% of free sulfuric acid to obtain a high extraction of phosphoric acid from the rock. I next separate this solution of phosphoric acid from the calcium sulfate and other impurities by filtration, as by passing it through the filter press 2, and washing it; and, I thereby obtain a clear solution of crude phosphoric acid containing only a few tenths of a per cent. of such impurities as iron, alumina and soluble lime, with a slight amount of free sulfuric acid, as above explained. This said clear solution is led from the filter 2 by means of the pipe 3 to the tank, or heating system 6. I may ammoniate this crude solution of phosphoric acid in any suitable manner, such as by adding aqua ammonia thereto, or by passing ammonia gas into the same. But I prefer to use the ammonia vapor made from commercial calcium cyanamid or lime nitrogen, which contains large quantities of steam, at a high temperature. To accomplish this I fill the towers 8 and 9 with chemical brick, and feed the crude phosphoric acid from the tank into the tower 9 by means of the pipe 11, while the said hot mixture of ammonia and steam as it comes from the cyanamid autoclaves is admitted through the pipe 13.

Any unabsorbed gases or vapors in the tank 9 are led from the top thereof to the bottom of tank 8 by means of the pipe 10; while from the top of said tank 8 the pipe 7 leads any unabsorbed gases, or vapors, into the acid heating system or tank 6, to warm up the acid solution before it reaches tank 9. In the first tower 9 fed with the ammonia, I so regulate the phosphoric acid, that when it leaves at the bottom, it is transformed into a mixture of mono-ammonium and di-ammonium phosphates, with as much of the latter as I can possibly obtain; in other words, in this tower I have a fairly large excess of ammonia. Into the second tower 8, which I use merely as a washing tower for clearing up the ammonia escaped from the first tower, I pass through the pipe 23 a large excess of phosphoric acid, so as to be certain to entrap all the last traces of ammonia. In this way I condense no steam in the system, allow no ammonia to escape unabsorbed, and at the same time make an ammonium phosphate solution quite high in di-ammonium phosphate. This ammonium phosphate solution I then run into the adjusting tank 14, through the pipe 31, and then add sufficient phosphoric acid to exactly neutralize it to the mono-ammonium phosphate stage.

The process of neutralization of this solution I have found involves some complications inasmuch as methyl orange the usual indicator, which has always been used for this work, does not indicate exact neutrality, but possesses a lag in its indications; so that if one were to operate without corrections, one would not obtain a strictly neutral solution of mono-ammonium phosphate, but would obtain a solution of mono-ammonium phosphate containing about one fourth of 1% of the phosphoric acid in the di-ammonium form. In the subsequent treatment of the product by this process, I have found that di-ammonium phosphate is decomposed into mono-ammonium phosphate, with a consequent loss of ammonia; and, therefore, in order to avoid this loss I find it necessary to correct for this lag of the indicator, by adding a corresponding quantity of phosphoric acid.

I am aware of the fact that there are existing patents calling for the neutralization of phosphoric acid by the use of ammonia, either in excess or to alkalinity. But such neutralized solutions, if treated in the manner hereinafter described, I have found always lose ammonia, and I, therefore, find it necessary to work in the manner just described, if one desires to avoid such losses.

I have also discovered that such a solution of mono-ammonium phosphate possesses rather peculiar properties in regard to its temperature concentration phenomena. That is to say, starting with a boiling point of something over 100° C., depending upon the initial concentration of the phosphoric acid, and which for a 20%, $P_2O_5$, solution is approximately 102° C., the boiling point slowly rises with an increase in concentration to 105° C. From this point on, the rise is much more rapid with an increase of the concentration than it has been up to the said point, until a temperature of 112° C. is reached, at which temperature, if the material is cooled, it will set to a solid mass, though it is still quite liquid when the temperature of 112° C. is first reached. I therefore conclude that what happens is the following: The rise in temperature from 102° C. up to 105° C. is, probably, simply a concentration of the solution; but from 105° there is probably a true fusion of the separated salt in a saturated solution of ammonium phosphate, up to a temperature of 112° C., at which point the rest of the water is simply driven off without a rise in temperature. At 112° C. the fused mass contains approximately 10% of water. If heating is continued this water is lost and the material will set in the evaporating apparatus to a solid mass, which cannot be removed except by a most laborious means. But if this material is tapped out of the evaporator at 112° C. into a very highly evacuated receiver, the sensible heat in the fused mass is sufficient to evaporate off nearly all of the water the instant the mass is discharged into the high vacuum, and one thus obtains directly from such receiver a product containing only 3% or 4% of water, and in a granulated form, which practically needs no other drying.

A convenient way of carrying out the above process of evaporation involves, therefore, the following steps:—I provide a multiple effect evaporator 15, 16, 17 and into the second effect 16 I pump through the pipe 30, the solution of ammonium phosphate from the adjusting tank 14, carrying it as usual to the last effect of my system through the pipe 29 and pump it back into the first effect 15 through the pipes 26 and 27 which effect 15 I supply with steam at such pressure, by means not shown, that I can readily obtain a final temperature of the liquid in this said effect 15 of 112° C. or thereabouts. I thus obtain in said effect 15 by this system of evaporation a fused product under atmospheric or super atmospheric pressure; and which product I alternately tap out by means of a suitable valve into the highly evacuated receivers 19 and 20. From these receivers, in turn, I obtain a dry granular product which of itself is suitable for admixtures with most fertilizers or is in such a condition that it can be readily passed through an ordinary drier without danger of adhering to its side walls, and thereby have all its moisture removed, if such is desirable. By this system of operation I have avoided the very great difficulty of drying a highly concentrated and wet solution of ammonium phosphate, such as would be obtained if ordinary evaporators were used. A product obtained from such ordinary evaporators would be so wet and adhere so strongly to iron that it would be impossible to dry it through any of the ordinary direct fired types of driers within the limits of reasonable costs.

What I claim is:

1. The process of making mono-ammonium phosphate, substantially devoid of di-ammonium phosphate from a solution of phosphoric acid which consists in feeding ammonia to said solution and testing the latter with a chemical indicator; and overcoming the lag of said indicator by so proportioning the quantities of acid and ammonia that said indicator will show a slight acid reaction, substantially as described.

2. The process of preventing the presence of substantial quantities of di-ammonium phosphate in the manufacture of mono-ammonium phosphate from a solution of phosphoric acid, which consists in treating said solution with ammonia until a chemical indicator shows a slight alkaline reaction; and then adding additional acid to an amount less than one per cent., substantially as described.

3. The process of making mono-ammonium phosphate substantially free from di-ammonium phosphate from phosphate rock and ammonia which consists in treating said rock with sulfuric acid to form a crude solution of phosphoric acid; treating said crude solution with ammonia until a chemical indicator shows a slight alkaline reaction; and then adding sufficient phosphoric acid to overcome the lag of said indicator and to cause the latter to show a slight acid reaction, substantially as described.

4. The process of making mono-ammonium phosphate substantially free from di-ammonium phosphate from phosphate rock and ammonia, which consists in treating said rock with sulfuric acid to form a crude solution of phosphoric acid; suitably filtering said solution; treating said crude filtered solution with ammonia until a chemical indicator shows a slight alkaline reaction; and then adding sufficient phosphoric acid to overcome the lag of said indicator and to cause the latter to show a slight acid reaction, substantially as described.

5. The process of making mono-ammonium phosphate substantially free from di-ammonium phosphate from phosphate rock and ammonia which consists in treating said rock with sufficient sulfuric acid to liberate the phosphoric acid and to dissolve the impurities present, thereby forming a crude solution of phosphoric acid; filtering said crude solution; treating said crude filtered solution with ammonia until a chemical indicator shows a slight alkaline reaction; and then adding sufficient phosphoric acid to overcome the lag of said indicator and to cause the latter to show a slight acid reaction, substantially as described.

6. The process of making a crude solution of phosphoric acid of a predetermined strength from phosphate rock, which consists in finely dividing said rock; adding thereto sufficient sulfuric acid to liberate the phosphoric acid present; adding an additional amount of sulfuric acid to dissolve the impurities in the rock; and adding a further quantity of sulfuric acid in accordance with the law of mass action and according to the concentration of phosphoric acid desired, substantially as described.

7. The process of making a mono-ammonium solution from phosphate rock, which consists in finely dividing said rock; adding thereto sufficient sulfuric acid to liberate the phosphoric acid present; adding an additional amount of sulfuric acid to dissolve the impurities in the rock; adding a further quantity of sulfuric acid in accordance with the law of mass action and according to the concentration of phosphoric acid desired; subjecting said solution to the action of a suitable filter and suitably treating said solution with ammonia; substantially as described.

In testimony whereof I affix my signature, in presence of two witnesses.

FRANK S. WASHBURN.

Witnesses:
A. E. BENN,
G. M. SCHURMAN.